UNITED STATES PATENT OFFICE.

MAX H. ISLER, OF MANNHEIM, GERMANY, ASSIGNOR TO THE BADISCHE ANILIN AND SODA FABRIK, OF LUDWIGSHAFEN, GERMANY.

BLACK SUBSTANTIVE COTTON-DYESTUFF.

SPECIFICATION forming part of Letters Patent No. 597,983, dated January 25, 1898.

Application filed October 29, 1896. Serial No. 610,481. (Specimens.) Patented in France August 9, 1895, No. 249,511, and in England August 13, 1895, No. 15,242.

*To all whom it may concern:*

Be it known that I, MAX H. ISLER, a citizen of the Swiss Republic, residing at Mannheim, in the Grand Duchy of Baden and Empire of Germany, have invented new and useful Improvements in the Manufacture of Black Substantive Cotton-Dyes, (for which I have obtained patents in England, No. 15,242, dated August 13, 1895, and in France, No. 249,511, dated August 9, 1895,) of which the following is a specification.

My present invention relates to the manufacture of black coloring-matter from anthraquinone derivatives, such as dinitroanthraquinones, the corresponding amidoanthraquinones, the intermediate reduction compounds, probably hydroxylamin derivatives, described by Römer, (*Berichte* 16,363,) alizarin, anthrapurpurin, flavopurpurin, anthraquinone-monosulfo-acid, anthraquinone alpha and beta disulfo-acids. I hereinafter refer to these bodies as the anthraquinone derivatives. My new black is obtained from them by subjecting them to an energetic treatment with alkaline sulfids or polysulfids. The said treatment is continued until a product completely soluble in water is obtained. The resulting product is entirely different from the initial anthraquinone dirivatives. The new product is a black substantive coloring-matter for cotton which possesses to a valuable degree the property of fastness against the action of light and resists perfectly the action of acids, soap, and chlorin. Its dilute aqueous solutions are green to violet-blue in color and it is precipitated by dilute acids, in which it is insoluble. It is soluble in alkalies and alkaline sulfids. It is slightly soluble in alcohol.

The following examples will serve to illustrate the manner in which my invention is best carried into practical effect and my new black coloring-matter obtained. The parts are by weight.

Example 1: Heat about two hundred and fifty parts of crystallized sodium monosulfid with about seventy-five parts of sulfur until it is saturated and so convert it into the corresponding sodium polysulfid, (Roscoe & Schorlemmer, *Lehrbuch der Chemie*, Braunschweig, second edition, volume 2, page 86.) Then add about fifty parts of 1.4' orthodinitroanthraquinone and heat until a test portion is quite soluble in water. After cooling a firm black mass is obtained which can be employed directly for dyeing, or it can be worked up in any suitable way. The product so obtained is readily soluble in cold water with a blue color and in concentrated sulfuric acid with a grayish-black color. It is rather soluble in alcohol with a green color, but it is insoluble in acetone. The aqueous solution can be precipitated with diluted mineral acids or with acetic acid. The precipitate is very readily soluble in alkalies and alkaline sulfids, and these solutions dye cotton black.

Example 2: In a similar manner to that described in the foregoing example alpha-dinitroanthraquinone and crude nitrated anthraquinones (containing a mixture of nitro bodies) can be converted into the corresponding dyestuffs. Fifty parts of the alpha or of the crude dinitroanthraquinone are taken instead of the same quantity of 1.4' orthodinitroanthraquinone. The product obtained from alpha-dinitroanthraquinone dissolves in water with a violet-blue color and also in alcohol, while in acetone it dissolves with a bluish-green color and in concentrated sulfuric acid with a brownish-red color. Cotton is dyed black.

Instead of the dinitroanthraquinones mentioned in the foregoing examples the same quantity of any of the other anthraquinone derivatives hereinbefore defined can be employed without otherwise changing the course of procedure and the corresponding dyestuffs are obtained.

Now what I claim is—

1. The process for the manufacture of black coloring-matter soluble in water which consists in energetically treating the anthraquinone derivatives hereinbefore defined with alkaline sulfids or polysulfids until a water-soluble product results free from unchanged initial material all substantially as described.

2. As a new article of manufacture black substantive coloring-matter, derived from anthraquinones and which is soluble in water giving greenish to violet-blue solutions, very slightly soluble in alcohol, insoluble in dilute acids, and soluble in alkalies and alkaline sulfids.

3. As a new article of manufacture the specific black substantive coloring-matter for cotton which can be derived from 1.4' ortho-dinitroanthraquinone and is soluble in cold water giving a blue solution, and in concentrated sulfuric acid giving a grayish-black color, slightly soluble in alcohol with green coloration, insoluble in dilute mineral acids, but soluble in alkalies and alkaline sulfids.

In testimony whereof I have hereunto set my hand in the presence of two subscribing witnesses.

MAX H. ISLER.

Witnesses:
ERNEST F. EHRHARDT,
BERNHARD C. HESSE.